(12) United States Patent
Coburn (10) Patent No.: US 10,101,775 B2
(45) Date of Patent: Oct. 16, 2018

(54) AUTOMATIC DISPLAY ADJUSTMENT SYSTEMS AND METHODS

(71) Applicant: Faraday&Future Inc., Gardena, CA (US)

(72) Inventor: Matthew Joseph Coburn, Redondo Beach, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/242,678

(22) Filed: Aug. 22, 2016

(65) Prior Publication Data

US 2018/0052494 A1 Feb. 22, 2018

(51) Int. Cl.
*G06F 1/16* (2006.01)
*B60R 11/02* (2006.01)
*B60R 11/00* (2006.01)

(52) U.S. Cl.
CPC ........ *G06F 1/1675* (2013.01); *B60R 11/0229* (2013.01); *G06F 1/1637* (2013.01); *B60R 2011/0028* (2013.01); *B60R 2011/0092* (2013.01); *B60R 2011/0276* (2013.01)

(58) Field of Classification Search
CPC .... G06F 1/1675; G06F 1/1637; G06F 3/1454; B60R 11/0229; B60R 2011/0276; B60R 2011/0092; B60R 2011/0028
USPC .......................................................... 701/49
See application file for complete search history.

(56) References Cited

U.S. PATENT DOCUMENTS

| 4,978,196 | A | 12/1990 | Suzuki et al. |
| 5,507,556 | A | 4/1996 | Dixon |
| 2015/0138043 | A1* | 5/2015 | Rawlinson .......... B60R 11/0235 345/2.2 |
| 2015/0138448 | A1* | 5/2015 | Rawlinson .......... B60R 11/0235 348/837 |
| 2015/0138449 | A1* | 5/2015 | Rawlinson ............ G06F 3/1454 348/837 |

* cited by examiner

*Primary Examiner* — Brian P Sweeney
(74) *Attorney, Agent, or Firm* — Skyler R. Lund (57) ABSTRACT

An automatic display adjustment system for a vehicle may include a controller coupled to a display and at least one motor for adjusting the display. The controller may be configured to detect a seat-back angle of a seat occupied by an occupant and determine a display angle based on the detected seat-back angle. The controller may be further configured to generate a control signal to actuate at least one motor for adjusting the display according to the determined display angle.

11 Claims, 4 Drawing Sheets

AUTOMATIC DISPLAY ADJUSTMENT SYSTEMS AND METHODS

TECHNICAL FIELD

The present disclosure relates generally to a display adjustment system for a vehicle, and more particularly, to a display adjustment system for automatically adjusting a display for an occupant of a vehicle.

BACKGROUND

Vehicles are often equipped with one or more displays for various purposes, such as for projecting instant measurement, parameters of engine, and text or video contents. These displays may be mounted at central panel, dashboard, seat headrest, seat back, or ceiling of a vehicle. When an occupant would like to use a display, he may need to adjust it manually to have a favorite viewing angle. When he changes his position or posture, he may need to re-adjust the display to maintain his favorite viewing angle. For example, when an occupant reclines his seat during watching a video, he may need to tilt his head in an uncomfortable fashion or re-adjust the display to his favorite viewing angle.

When more than one occupant wants to watch contents on a display, the display may be maintained at its default display angle or be adjusted by one of them according to his personal judgment. However, sometimes the default display angle or the adjusted angle may not properly balance the viewing angles of all occupants. Also, whenever one of occupants reclines his seat, another adjustment may be necessary again. It would be desirable to provide a suitable viewing angle for either one or multiple occupants no matter how they rise and recline their seats without requiring manual adjustments.

The disclosed automatic display adjustment system is directed to mitigating or overcoming one or more of the problems set forth above and/or other problems in the prior art.

SUMMARY

One aspect of the present disclosure is directed to an automatic display adjustment system for a vehicle. The automatic display adjustment system may include a controller coupled to a display and at least one motor for adjusting the display. The controller may be configured to detect a seat-back angle of a seat occupied by an occupant and determine a display angle based on the detected seat-back angle. The controller may be further configured to generate a control signal to actuate at least one motor for adjusting the display according to the determined display angle.

Another aspect of the present disclosure is directed to a vehicle infotainment system. The vehicle infotainment system may include a display configured to provide contents to an occupant, at least one motor configured to adjust a display angle of the display, and a controller coupled to the display and the at least one motor. The controller may be configured to detect a seat-back angle of a seat occupied by an occupant and determine a display angle based on the detected seat-back angle. The controller may be further configured to generate a control signal to actuate the at least one motor for adjusting the display according to the determined display angle.

Yet another aspect of the present disclosure is directed to a method for automatically adjusting a display for an occupant of a vehicle. The method may include detecting a seat-back angle of a seat occupied by the occupant and determining a display angle based on the detected seat-back angle. The method may further include generating a control signal to actuate at least one motor for adjusting the display according to the determined display angle.

DETAILED DESCRIPTION

The disclosure is generally directed to an automatic display adjustment system that may provide a suitable viewing angle for either one or multiple occupants no matter how they rise and recline their seats without requiring manual adjustments. In some embodiments, the automatic display adjustment system may include a controller coupled to a display and at least one motor for adjusting the display. The controller may be configured to detect a seat-back angle of a seat occupied by the occupant and determine a display angle based on the detected seat-back angle. The controller may also be configured to generate a control signal to actuate the at least one motor for adjusting the display according to the determined display angle. In some embodiments, the controller may be further configured to detect an additional adjustment to the display angle performed by the occupant and save the additional adjustment associated with the occupant. The controller may be further configured to determine the display angle based on the detected seat-back angle and the saved additional adjustment associated with the identified occupant. In some embodiments, the controller may be configured to detect seat-back angles of seats occupied by multiple occupants and determine individual display angles based on the detected seat-back angles. The controller may also be configured to determine the display angle based on the individual display angles and generate a control signal to actuate the at least one motor for adjusting the display according to the determined display angle. In some embodiments, the determination of the display angle may include averaging the individual display angles.

Figure 1:
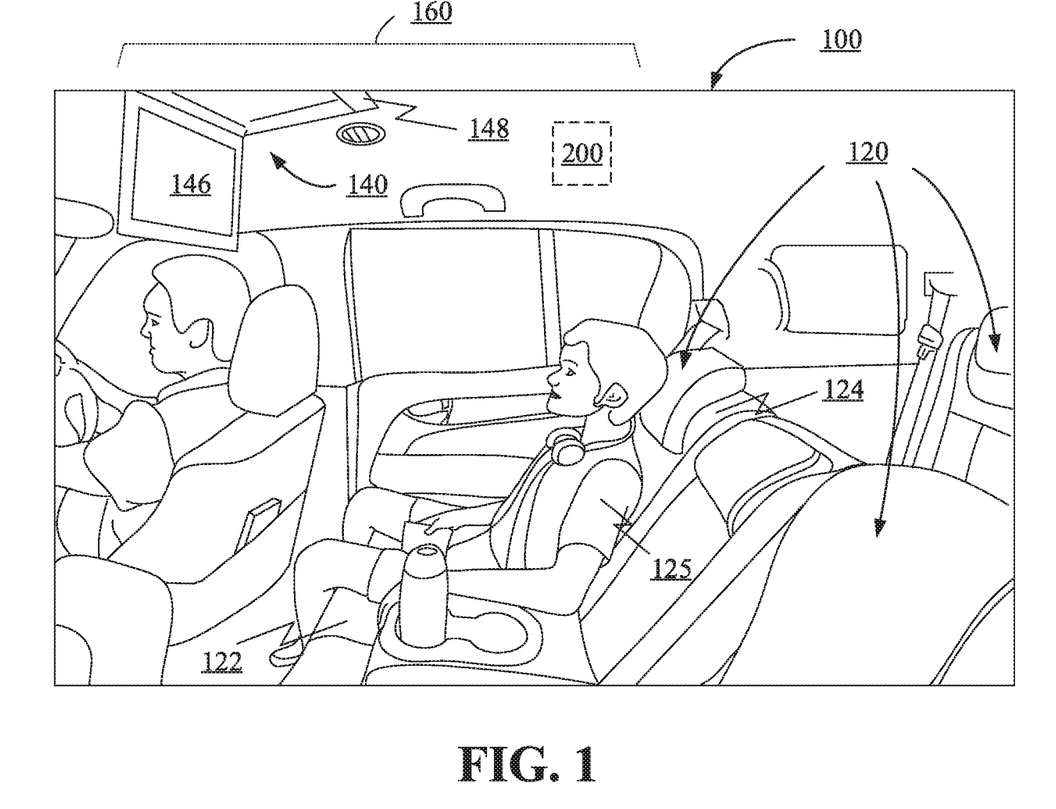
FIG. 1 is an illustration of an exemplary display adjustment system in a vehicle, according to a disclosed embodiment.

FIG. 1 is an illustration of an exemplary display adjustment system 160 in a vehicle 100, according to a disclosed embodiment. A vehicle 100 may have one of various body styles, such as a sports car, a coupe, a sedan, a pick-up truck, a station wagon, a sports utility vehicle (SUV), a minivan, or a conversion van. Vehicle 100 may be an electric vehicle, a fuel cell vehicle, a hybrid vehicle, or a conventional internal combustion engine vehicle. Vehicle 100 may be configured to be operated by a driver occupying vehicle 100, remotely controlled, and/or autonomously.

As illustrated in FIG. 1, vehicle 100 may include a plurality of seats 120 and a display 140. Seat 120 may include a seat bottom 122 and a seat back 124 that allow an occupant to lean back while watching contents shown on display 140. Seat bottom 122 may be lowered and raised, and/or seat back 124 may be raised and reclined so that an occupant may be able to change his posture while watching contents on display 140. Display 140 may include a screen 146, a display base 148, and at least one motor 147. As shown in FIG. 1, display 140 may be a drop-down projector screen mounted to an interior surface of vehicle 100. In some embodiments, display 140 may be a screen (not shown) mounted to central panel, dashboard, seat headrest, or seat back through a pivoting mechanism in vehicle 100. Screen 146 may be an LCD or LED display, or any other suitable digital display for displaying digital contents. Screen 146 may be adjusted to a suitable angle by actuating motor 147 for displaying contents to one or more occupants in vehicle 100. Screen 146 may be mounted or otherwise attached to an interior of vehicle 100 via display base 148. In some embodiments, display base 148 may include a pivoting mechanism for adjusting the display angle of screen 146. Screen 146 may be adjusted, through display base 148, to a suitable position for displaying contents to one or more occupants. In FIG. 1, for example, an occupant 125 may sit on a seat bottom 122 and lie on seat back 124 while watching contents on screen 146 of display 140 in vehicle 100. Occupant 125 may lower seat back 124 and lean back in a comfortable posture to watch contents on screen 146.

Figure 2:
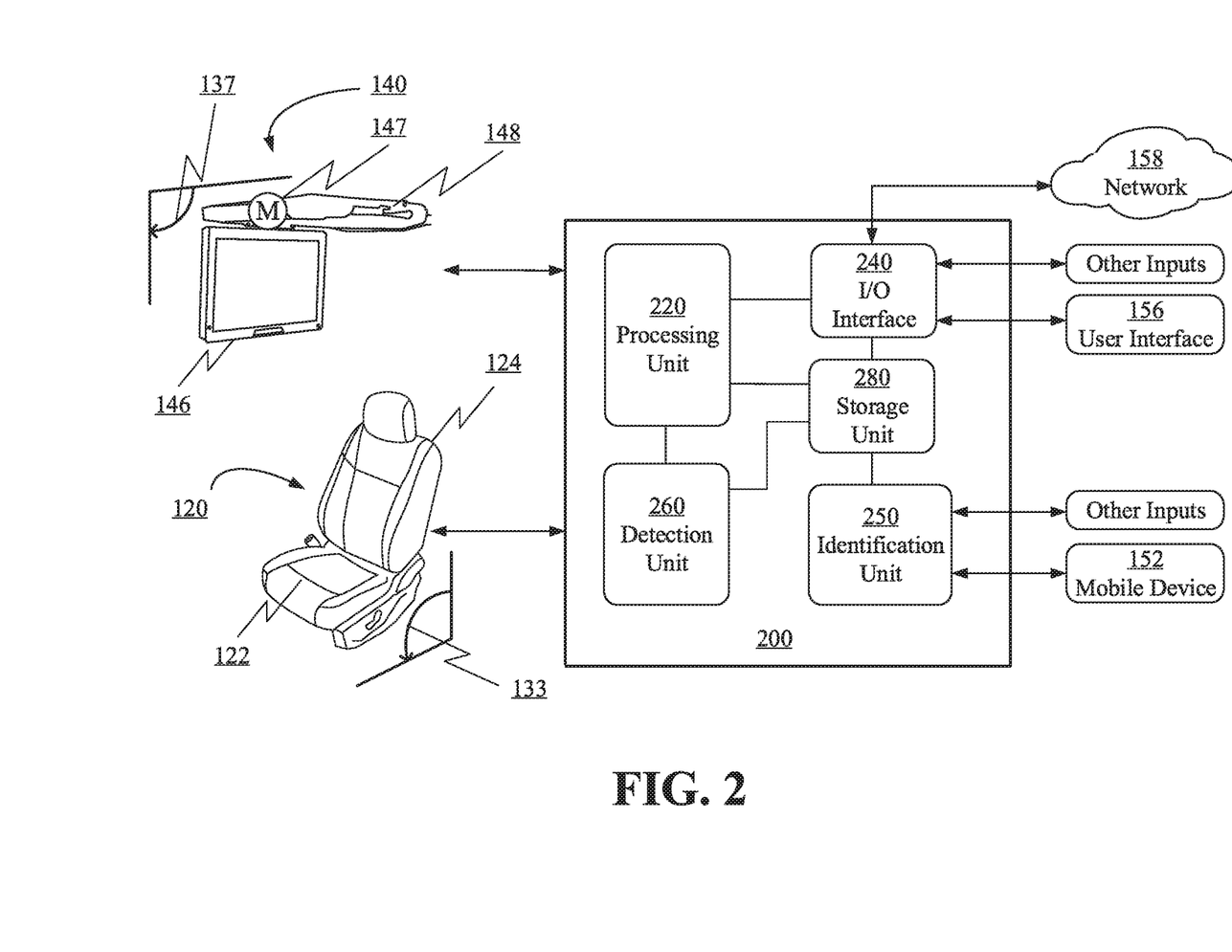
FIG. 2 is a block diagram of the display adjustment system of FIG. 1 including an exemplary controller, according to a disclosed embodiment.

Automatic display adjustment system 160 may include a controller 200 coupled to display 140 and at least one motor 147 (as depicted in FIG. 2). Controller 200 may be coupled to motor 147 for driving the pivoting mechanism and configured to adjust the screen of display 140 through the pivoting mechanism to provide a suitable viewing angle for occupant 125. In some embodiments, controller 200 may be configured to detect a seat-back angle of a seat occupied by an occupant. For example, controller 200 may be configured to detect seat-back angle 133 (as depicted in FIG. 2), the angle between seat bottom 122 and seat back 124, of seat 120 occupied by occupant 125. Detecting seat-back angle 133 may be, for example, carried out by measuring a gear or a spring at conjunction of seat bottom 122 and seat back 124. For another example, detecting seat-back angle 133 may be carried out by taking side images of seat 120 and comparing to a set of patterns corresponding to various seat-back angles.

Controller 200 may be further configured to determine a display angle based on the detected seat-back angle. For example, controller 200 may determine a display angle 137 (as depicted in FIG. 2) of display 140 based on the detected seat-back angle 133. In some embodiments, display angle 137 may be a drop-down angle between screen 146 and display base 148 of display 140. In some other embodiments, display angle 137 may be an angle between screen 146 and the surface, e.g. the ceiling of vehicle 100, on which display 140 is mounted. Display angle 137 may be determined based on the location on which display 140 is mounted in vehicle 100. For example, display angle 137 can be determined equal to detected seat-back angle 133 when display 140 is a drop-down projector screen mounted to the ceiling of vehicle 100, as shown in FIG. 1. That is, display angle 137 can be determined to be 95, 105, or 115 degrees when seat-back angle 133 is detected as 95, 105, or 115 degrees respectively.

Controller 200 may be further configured to generate a control signal to actuate at least one motor 147 for adjusting display 140 according to determined display angle 137. For example, controller 200 may generate a control signal to actuate motor 147 to rotationally drop down screen 146 to 105 degrees when the detected seat-back angle is 105 degrees. In some embodiments, controller 200 may also be configured to generate a control signal to actuate at least one motor 147 to rotate screen 146 horizontally by using, for example, a pivot mechanism or a gear.

FIG. 2 is a block diagram of automatic display adjustment system 160 of FIG. 1 including an exemplary controller 200, according to a disclosed embodiment. Controller 200 may be coupled to at least one motor 147 of display 140 and controller 200 may be configured to send a control signal to actuate motor 147 for rotationally dropping down and/or horizontally rotating screen 146. In response, motor 147 may provide torque to, for example, a gear or a pivot mechanism to rotationally drop down and/or horizontally rotate screen 146. Controller 200 may also be connected to seat 120 and may be configured to detect seat-back angle 133 between seat bottom 122 and seat back 124. Controller 200 may also be configured to receive and transmit signals from and to user interface 156 and other inputs for the purpose of displaying information, setting up user preference, or receiving input signals. Controller 200 may also be configured to connect to network 158 to retrieve up-to-date information and system configuration, or to send user experience and preference to a central server (not shown) of automatic display adjustment system 160. The central server may be on board of vehicle 100 or located remotely, such as in a cloud. Network 158 may include a number of different types of networks enabling communication between controller 200 and a remote server. In some embodiments, network 158 may be a wired network, a local wireless network (e.g., Bluetooth™, WiFi, near field communications (NFC), etc.), a cellular network (e.g., GPRS, WCDMA, HSPA, and LTE), an Internet, or the like, or a combination thereof. Other known communication methods which provide a medium for transmitting data are also contemplated. Controller 200 may also be configured to receive and transmit signals from and to a plurality of mobiles devices 152 of occupants and/or other inputs (e.g., cameras) in order to identify occupants and/or obtain data indicative of occupants' preference.

As illustrated in FIG. 2, controller 200 may include a processing unit 220, an I/O interface 240, a detection unit 260, an identification unit 250, and a storage unit 280. One or more of the components of controller 200 may be included in an on-board computer of vehicle 100. These units may be configured to transfer data and send or receive instructions between or among each other.

Processing unit 220 may include any appropriate type of general-purpose or special-purpose microprocessor, digital signal processor, or microcontroller. Processing unit 220 may be configured to receive and process signals to determine a plurality of conditions of the operation of automatic display adjustment system 160. Processing unit 220 may be configured to send and receive signals to and from detection unit 260 about detection of seat-back angle 133. Processing unit 220 may also be configured to determine display angle 137 based on detected seat-back angle 133. Processing unit 220 may also be configured to generate and transmit a control signal to actuate motor 147 of display 140 for adjusting screen 146 according to determined display angle 137. In some embodiments, processing unit 220 may further be configured to determine a plurality of individual display angles based on a plurality of detected seat-back angles 133 respectively for a plurality of occupants, and determine display angle 137 based on the determined individual display angles. Processing unit 220 may also be configured to process input signals received from I/O interface 240. For example, processing unit 220 may be configured to process and respond to a user's input, via I/O interface 240, from user interface 156. Processing unit 220 may also be configured to control identification unit 250 to identify one or multiple occupants. Processing unit 220 may also be configured to store and retrieve data into and from storage unit 280.

I/O interface 240 may be configured for two-way communication between controller 200 and various input sources, such as user interface 156. I/O interface 240 may also be configured to send and receive operating signals to and from processing unit 220, detection unit 260, and identification unit 250. For example, I/O interface 240 may be configured to send input signals from user interface 156 to processing unit 220 for further processing or determining response to an occupant's input. I/O interface 240 may also be configured to send input signals from a seat-back angle detector to detection unit 260 for detecting seat-back angle 133. I/O interface 240 may also be configured to send input signals from user interface 156 or other inputs (e.g., cameras) to identification unit 250 for identifying an occupant. I/O interface 240 may also be configured to send and receive data to and from network 152 for various purposes, such as storing user data remotely, downloading user data, and downloading system configuration update.

Detection unit 260 may include an appropriate type of hardware, such as integrated circuits and field programmable gate array, or software, such as a set of instructions, a subroutine, or a function (i.e. a functional program) executable on a processor or controller, to carry out detection function of seat-back angle by, for example, comparing a received measurement result, from seat 120, to existing patterns or scales to decide seat-back angle 133. In some embodiments, detection unit 260 may also be configured to perform seat-back angle detection according to other input data received from I/O interface 240. For example, detection unit 260 may be configured to detect seat-back angle 133 according to input data from a camera or other inputs. In some embodiments, detection unit 260 may be further configured to detect multiple seat-back angles 133. For example, two occupants sit in vehicle 100 and both would like to watch a video on display 140. Detection unit 260 may detect two seat-back angles 133 of two seats 120 occupied by the two occupants respectively and send detected seat-back angles 133 to processing unit 220.

In some embodiments, detection unit 260 may also be configured to detect an additional adjustment to display angle 137 performed by the occupant. For example, occupant 125 fine-tunes screen 146 to his own favorite display angle after the adjustment operations performed by automatic display adjustment system 160. Detection unit 260 may be configured to detect the additional angle adjusted by occupant 125 according to a feedback signal from display 140 and save it associated with occupant 125 into storage unit 280. The feedback signal from display 140 may be received by I/O interface 240 and send to detection unit 260 and/or processing unit 220. Accordingly, the additional adjustment angle may be detected and saved into storage unit 280.

Identification unit 250 may include an appropriate type of hardware, such as integrated circuits and field programmable gate array, or software, such as a set of instructions, a subroutine, or a function (i.e. a functional program) executable on a processor or controller, to carry out occupant identification function. Occupant identification may be carried out by, for example, connecting to occupant's mobile devices and receiving occupant's identification associated therewith, capturing images via one or more cameras of vehicle 100 and processing the images with algorithms such as image recognition, or detecting biometrics of occupants. For example, identification unit 250 may identify occupant 125 by connecting to his mobile device 152 and accessing required information for identification. For another example, identification unit 250 may identify occupant 125 by face recognition through comparing his image taken by a camera with pre-stored image of occupant 125 in storage unit 280. Alternatively, occupant's images may be downloaded from occupant's mobile device 152 or network 158, or taken and saved during initialization of automatic display adjustment system 160.

Storage unit 280 may include one or more types of memory devices or modules, such as registers in circuits, cache memories, random access memories (RAM), read only memories (ROM), disk memories, and cloud memories. Storage unit 280 may be configured to store default setting, occupant data and preference, biometric parameters, identification data, and so on. Storage unit 280 may also be configured to store any kind of data temporarily for processing unit 220, detection unit 260, identification unit 250, or from I/O interface 240.

Figure 3:
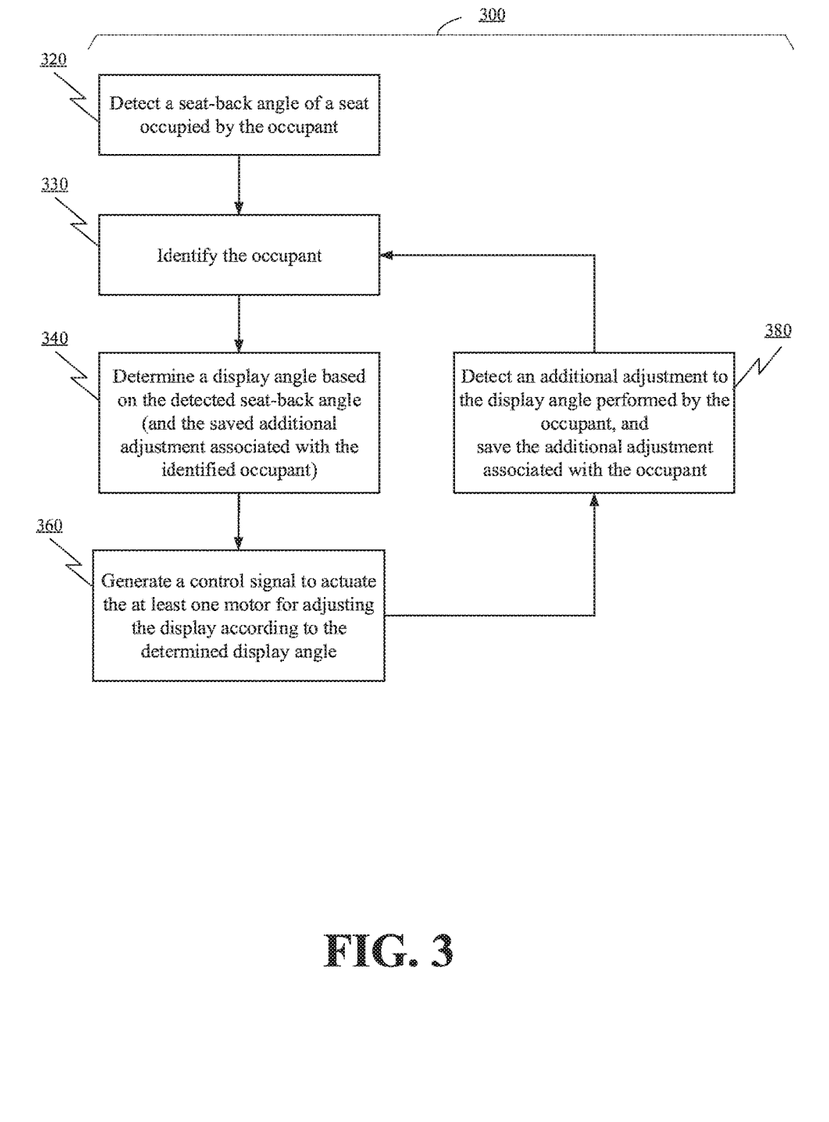
FIG. 3 is a flow chart illustrating an exemplary method of adjusting a display for an occupant in a vehicle, performed by the controller of FIG. 2, according to a disclosed embodiment.

FIG. 3 is a flow chart illustrating an exemplary method 300 for adjusting display 140 for an occupant in vehicle 100, performed by controller 200 of FIG. 2, according to a disclosed embodiment.

Step 320 may include detecting a seat-back angle of a seat occupied by an occupant. For example, when occupant 125 sits on seat 120 and would like to watch contents on display 140, step 320 may include detecting seat-back angle 133 between seat bottom 122 and seat back 124 of seat 120 by measuring a gear or a spring at conjunction of seat bottom 122 and seat back 124. In some embodiments, whenever occupant 125 rises or reclines his seat 120, detecting a seat-back angle of step 320 may also include detecting seat-back angle 133 again. For example, when occupant 125 reclines his seat from 95 degrees to 105 degrees after 20 minutes while watching a movie on display 140, step 320 may include detecting seat-back angle 133 again as 105 degrees.

Step 330 may include identifying occupant 125. For example, step 330 may include identifying occupant 125 by detecting mobile device 152 belonging to occupant 125 and receiving identity information associated with mobile device 152. Identification information may include, for example, occupant 125's phone number, image or email address available in mobile device 152. Access to identification information in mobile device 152 may require authentication and/or occupant 125's permission. As another example, step 330 may include identifying occupant 125 by capturing an image of occupant 125. In some embodiments, one or multiple cameras (not shown) may be installed in vehicle 100. An identification image of occupant 125 may be stored in display adjustment system 160 during initial setup or previous usage. Step 330 may include identifying occupant 125 by comparing an images taken by the camera(s) and the identification image of occupant 125.

In some embodiments, step 330 may further include storing an occupant's information in automatic display adjustment system 160, for future identification purpose. For example, step 330 may include storing an occupant's identification information when the occupant is yet unknown to automatic display adjustment system 160. Accordingly, step 330 may be able to identify the occupant next time. For another example, step 330 may include storing an identified occupant's additional information associated with the occupant when such information is available and not yet stored in automatic display adjustment system 160. Accordingly, step 330 may be able to identify the occupant using more identification information associated with the occupant next time.

Step 340 may include determining display angle 137 based on detected seat-back angle 133 in step 320. For example, step 340 may include determining display angle 137 as 101 degrees when detected seat-back angle 133 in step 320 may be detected as 91 degrees, where display angle 137 may be determined as 10 degrees more than detected seat-back angle 133. In some embodiments, determining display angle 137 of step 340 may include determining display angle 137 substantially the same as detected seat-back angle 133. For example, step 340 may include determining display angle 137 as 95, 105, or 115 degrees when detected seat-back angle 133 in step 320 is 90, 105, or 115 degrees respectively.

In some embodiments, Step 340 may further include determining whether display angle adjustment data was previously captured and saved for occupant 125. In some embodiments, occupant 125 may have been in vehicle 100 before and he made an additional adjustment to the display angle after display adjustment system 160 had automatically adjusted the display angle for him. For example, occupant 125 may have adjusted screen 146 for 5 more degrees to reach his own favorite display angle after the adjustment operations of automatic display adjustment system 160. Such an additional angle adjustment, e.g., 5 degrees, made by occupant 125 may be detected and saved associated with occupant 125 (will be described in step 380). In that case, determining display angle 137 of step 340 may include determining display angle 137 based on detected seat-back angle 133 in step 320 and the previously saved additional adjustment associated with the identified occupant. For example, display angle 137 may be determined based on detected seat-back angle 133 in step 320 and the saved additional adjustment, e.g., 5 more degrees, associated with identified occupant 125. For instance, step 340 may include determining display angle 137 as 102 degrees when detected seat-back angle 133 in step 320 is 97 degrees by adding the saved additional 5 degrees associated with occupant 125.

If there is no additional adjustment data associated with occupant 125 saved in automatic display adjustment system 160, step 340 may include determining display angle 137 based on detected seat-back angle 133 in step 320 and an estimated additional adjustment for occupant 125 based on saved additional adjustments associated with other previously identified occupants. For example, after the adjustment operations of automatic display adjustment system 160, three occupants viewing display 140 may have adjusted down screen 146 for an additional 5, 6, and 7 degrees to arrive at their respective favorite display angles. These additional angles, 5, 6, and 7 degrees, may be detected and saved associated with these three occupants respectively (will be described in step 380). When a new occupant, not the three occupants, sits on seat 120, an additional display angle may be estimated based on the saved additional 5, 6, and 7 degrees of adjustment associated with previously identified three occupants. Step 340 may include determining display angle 137 for the new occupant based on detected seat-back angle 133 in step 320 and the estimated additional adjustment from 5, 6, and 7 degrees of adjustment associated with previously identified occupants. For instance, step 340 may include determining display angle 137 as 103 degrees based on the detected seat-back angle 133 (97 degrees) in step 320 and an additional adjustment of 6 degrees, where the additional 6 degrees may be an average of the saved 5, 6, and 7 degrees associated with previously identified three occupants.

Step 360 may include generating a control signal to actuate at least one motor 147 for adjusting display angle 137 of display 140 to the determined display angle. For example, step 360 may include generating a control signal to actuate motor 147 of display 140 to rotationally drop down screen 146 for 97 degrees when display angle 137 may be determined in step 340 to be 97 degrees. In some embodiments, generating a control signal of step 360 may include generating a control signal to actuate one or more motors 147 to rotationally drop down and/or horizontally rotate screen 146. For example, step 360 may include generating a control signal to actuate motor 147 of display 140 to rotationally drop down screen 146 for 97 degrees and horizontally rotate 10 degrees right for occupant 125.

Step 380 may include detecting an additional adjustment to display angle 137 performed by occupant 125 and saving the additional adjustment associated with occupant 125. For example, when occupant 125 may adjust down screen 146 5 degrees more to have his own favorite display angle after the adjustment operations of automatic display adjustment system 160. Step 380 may include detecting such additional adjustment, e.g., 5 degrees, and saving it associated with occupant 125 into storage unit 280.

Figure 4:
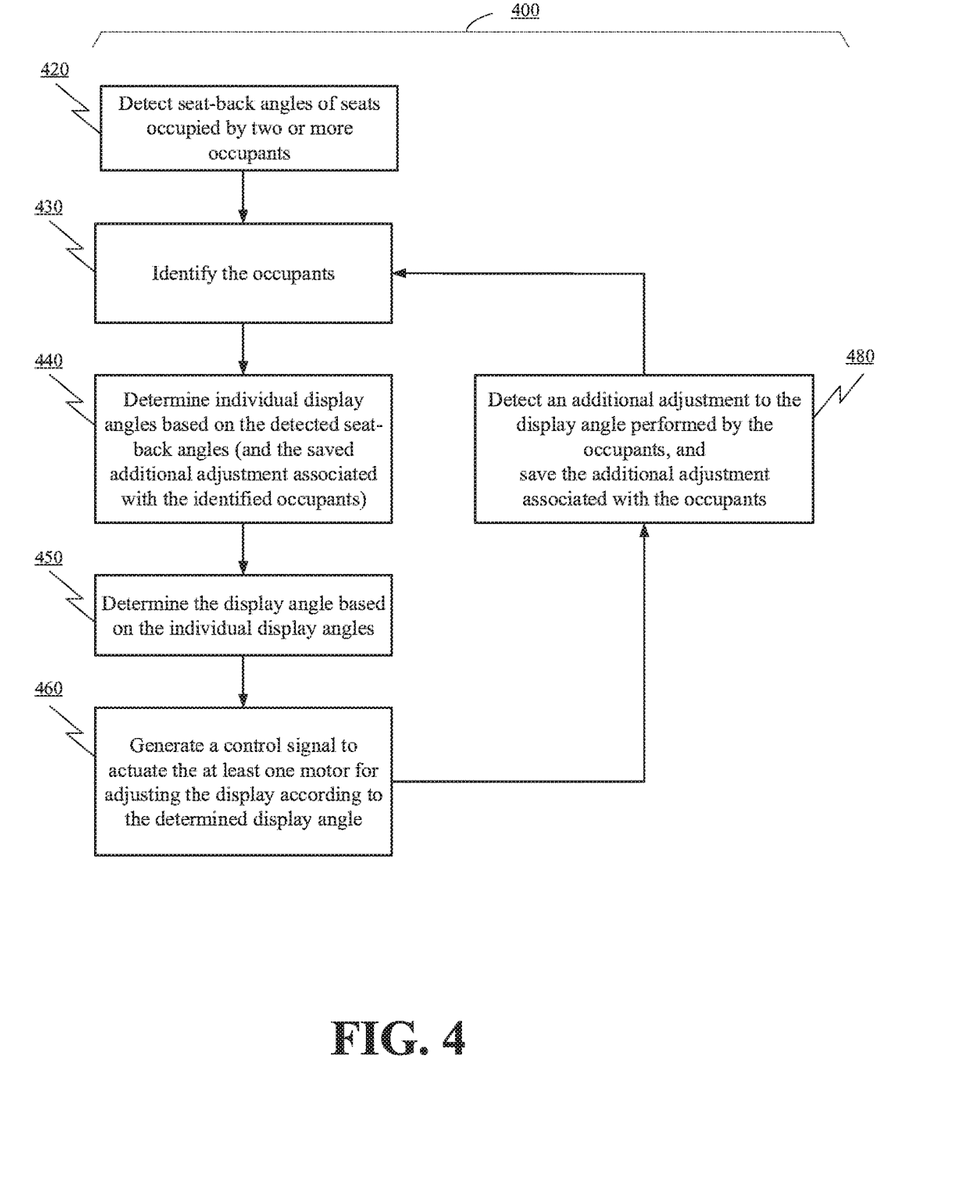
FIG. 4 is a flow chart illustrating an exemplary method of adjusting a display for multiple occupants in a vehicle, performed by the controller of FIG. 2, according to a disclosed embodiment.

FIG. 4 is a flow chart illustrating an exemplary method 400 of adjusting display 140 for multiple occupants in vehicle 100, performed by controller 200 of FIG. 2, according to a disclosed embodiment.

Step 420 may include detecting seat-back angles 133 of seats 120 occupied by two or more occupants. For example, when two occupants sit on two seats 120 and would like to watch contents together on display 140, step 420 may include detecting two seat-back angles 133 between seat bottoms 122 and seat backs 124 of the respective seats 120 by measuring gears or springs at conjunction of seat bottoms 122 and seat backs 124. In some embodiments, whenever one of occupants rises or reclines his seat 120, detecting seat-back angles of step 420 may also include detecting seat-back angles 133 again. For example, when one of two occupants may recline his seat from 95 degrees to 105 degrees after 20 minutes while watching a movie on display 140, step 420 may include at least detecting seat-back angle 133 of seat 120 occupied by the occupant again and updating detected seat-back angle 133 of the occupant to be 105 degrees.

Step 430 may include identifying occupants in vehicle 100 before determining individual display angles respectively. For example, step 430 may include identifying occupants in vehicle 100 before determining individual display angles of step 440. Once occupants may be identified in step 430, step 440 may include determining individual display angles for the identified occupants based on detected seat-back angles 133 of identified occupants in step 420 and the saved additional adjustments associated with the identified occupants respectively (will be described in step 440). In some embodiments, step 430 may include identifying one or more occupants as a new occupant(s) when there may be no information about the one or more occupants in automatic display adjustment system 160. These new occupants' additional adjustments may be determined by estimation in step 440 (will be described in step 440).

In some embodiments, identifying occupants in vehicle 100 of step 430 may also include identifying the owner or main user of vehicle 100. For example, step 430 may include identifying whether one of occupants in vehicle 100 is the owner by connecting to their mobile devices and accessing identification information therein. For another example, step 430 may include identifying whether one of occupants in vehicle 100 is the owner by taking photos of occupants or receiving images of occupants from their mobile devices, and comparing to an identification image associated with the owner. In some embodiments, step 430 may also include identifying whether an occupant in vehicle 100 is sleeping by taking images of him and examining whether his eyes have been closed for a while. In some embodiments, step 430 may also include identifying whether an occupant is doing activities other than watching display 140, such as operating his mobile device 152 or another portable device, reading a book, listening to music, or chatting with other passengers.

In some embodiments, step 430 may also include saving an occupant's information when he is yet unknown to automatic display adjustment system 160, as described in step 330. In some embodiments, step 430 may also include saving an occupant's addition identification information when such information is yet unknown to automatic display adjustment system 160, as described in step 330.

Step 440 may include determining individual display angles based on detected seat-back angles 133 in step 420. For example, step 440 may include determining individual display angles as 101 and 111 degrees for two occupants when seat-back angles 133 detected in step 420 are 91 and 101 degrees respectively, where individual display angles may be determined as 10 degrees more than detected seat-back angles 133. In some embodiments, determining individual display angle of step 440 may include determining individual display angle substantially the same as detected seat-back angle 133. For example, step 440 may include determining individual display angle as 95, 105, or 115 degrees when detected seat-back angle 133 in step 420 is 90, 105, or 115 degrees respectively.

In some embodiments, determining individual display angles of step 440 may include determining individual display angles based on detected seat-back angles 133 in step 420 and the saved additional adjustments associated with the identified occupants. For example, while being the only occupant watching display 140 in vehicle 100, two occupants may adjust down screen 146 5 and 10 degrees more to have their own favorite display angles respectively after the adjustment operations of automatic display adjustment system 160. Such additional angles, 5 and 10 degrees, adjusted by the two occupants may be detected and saved associated with the two occupants (will be described in step 480). Step 440 may include determining individual display angles based on detected seat-back angles 133 in step 420 and the saved additional adjustments, e.g., 5 and 10 degrees, associated with the two identified occupants. For instance, step 440 may include determining individual display angles as 102 and 107 degrees when detected seat-back angles 133 in step 420 are both 97 degrees by respectively adding the saved additional 5 and 10 degrees associated with the two occupants.

In some embodiments, determining individual display angles of step 440 may include determining individual display angles based on detected seat-back angle 133 in step 420 and an estimated additional adjustment for a new occupant based on saved additional adjustments associated with previously identified occupants, as described in step 340. Step 440 may include determining individual display angle for the new occupant based on detected seat-back angle 133 of the occupant in step 420 and the estimated additional adjustment associated with previously identified occupants. For instance, step 440 may include determining individual display angle as 103 degrees when detected seat-back angle 133 of the occupant in step 420 is 97 degrees by adding an additional 6 degrees, the additional 6 degrees may be averaged out from 5, 6, and 7 degrees associated with previously identified three occupants.

Step 450 may include determining display angle 137 based on the determined individual display angles in step 440. For example, step 450 may include determining display angle 137 as 106 degrees by averaging determined individual display angles 101 degrees and 111 degrees of two occupants in step 440.

In some embodiments, determining display angle 137 of step 450 may include determining display angle 137 based on a weighted average of determined individual display angles in step 440. Each occupant may be assigned a weight. All weights of occupants add up to 1. For example, two occupant may be assigned a weight of 0.7 and 0.3, respectively. In some embodiments, an owner of vehicle 100 may be assigned a weight higher than that of other occupants. An occupant may be assigned a low weight if he is detected doing something else, rather than watching display 140. For instance, an occupant may be weighted as 0.1 while he is detected using his mobile device 152. An occupant may be weighted as 0 while he is detected as sleeping or he inputs through user interface 156 that he is not going to watch contents of display 140. In some embodiments, weights may be periodically updated to account for changes in occupant activities. Weights for occupants on different seats may also be configurable by inputs through user interface 156. Step 450 may include determining display angle 137 based on a weighted average of individual display angles. For example, display angle may be determined as 104 degrees based on a weighted average of individual display angles of 101 degrees and 111 degrees of two occupants whose weights are assigned as 0.7 and 0.3, respectively.

In some embodiments, determining display angle 137 of step 450 may include determining display angle 137 as the individual display angle of the owner of vehicle 100. For example, when one of occupants in vehicle 100 may be identified as the owner of vehicle in step 430, step 450 may include determining display angle 137 as the determined individual display angle of the owner.

Step 460 may include generating a control signal to actuate at least one motor 147 for adjusting display angle 137 of display 140 to the determined display angle. For example, step 460 may include generating a control signal to actuate motor 147 of display 140 to rotationally drop down screen 146 for 97 degrees when display angle 137 may be determined in step 440 to be 97 degrees. In some embodiments, generating a control signal of step 460 may include generating a control signal to actuate one or more motors 147 to rotationally drop down and/or horizontally rotate screen 146. For example, step 460 may include generating a control signal to actuate motor 147 of display 140 to rotationally drop down screen 146 for 97 degrees and horizontally rotate it to the right for 10 degrees for two occupants when display angle 137 may be determined in step 440 to be 97 degrees and the two occupants may be detected as sitting on seats 120 at the right column in vehicle 100.

Step 480 may include detecting an additional adjustment to display angle 137 performed by the occupants in vehicle 100 and saving the additional adjustment associated with these occupants, similar to step 380. For example, a set of occupants may adjust down screen 146 5 degrees more to have their favorite display angle after the adjustment operations of automatic display adjustment system 160. Step 480 may include detecting such additional adjustment, 5 degrees, and saving it associated with this set of occupants in automatic display adjustment system 160.

In some embodiments, as part of method 300 or method 400, display angle 137 may be further adjusted to avoid interference with the movement of a first row seat, e.g., driver seat or a driver side passenger seat. For example, due to the installed position of display 140 in vehicle 100, it may interfere with reclining or other movements of the front row seat at certain display angles. As another example, certain display angle 137 may cause display 140 to disturb or otherwise interfere with a front row occupant, such as to present a partial view to the occupant in a reclined position. To avoid such interference, display angle 137 of display 140 may be restricted within a certain range based on the position and/or seat-back angle 133 of the driver's seat 120 or the front row passenger seat. In some embodiments, method 300 or method 400 may include detecting the seat position and seat-back angle of the front row seats, and adjust display angle 137 based on the seat position and seat-back angle so that display 140 does not restrict the movement of the front row seats and not disturb the front row occupants.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

Although the descriptions above are made in the context of a vehicle, it is contemplated that the disclosed systems and methods may be applied to adjust displays in non-vehicle settings as well. For example, the disclosed systems and methods can be implemented in a movie theatre or home theatre to adjust the display angle in response to a reclining adjustment of the audience's seat.

It will be apparent to those skilled in the art that various modifications and variations can be made to the disclosed remote control system and related methods. Other embodiments will be apparent to those skilled in the art from consideration of the specification and practice of the disclosed remote control system and related methods. It is intended that the specification and examples be considered as exemplary only, with a true scope being indicated by the following claims and their equivalents.

What is claimed is:

1. A display adjustment system for automatically adjusting a display for an occupant of a vehicle, comprising:
   a controller coupled to the display and at least one motor for adjusting the display, configured to:
      detect a seat-back angle of a seat occupied by the occupant;
      determine a display angle based on the detected seat-back angle; and
      generate a control signal to actuate the at least one motor for adjusting the display according to the determined display angle,
   wherein there are two or more occupants,
   wherein detecting the seat-back angle includes detecting seat-back angles of seats occupied by the two or more occupants, and
   wherein determining the display angle includes:
      determining individual display angles based on the detected seat-back angles; and
      determining the display angle based on the individual display angles.

2. The display adjustment system of claim 1,
   wherein the controller is further configured to identify one of the occupants as the owner of the vehicle; and
   determine the display angle as the individual display angle determined based on the detected seat-back angle of the owner.

3. The display adjustment system of claim 1, wherein the controller is configured to determine the display angle based on a weighted average of the individual display angles.

4. The display adjustment system of claim 1, wherein the controller is further configured to detect a position of a front row seat, and adjust the display angle further based on the position of the front row seat.

5. The display adjustment system of claim 1, wherein the display is a drop-down projector screen mounted to an interior surface of the vehicle.

6. The display adjustment system of claim 1, wherein the determined display angle is substantially the same as the detected seat-back angle.

7. A display adjustment system for automatically adjusting a display for an occupant of a vehicle, comprising:
   a controller coupled to the display and at least one motor for adjusting the display, configured to:
      detect a seat-back angle of a seat occupied by the occupant;
      determine a display angle based on the detected seat-back angle; and
      generate a control signal to actuate the at least one motor for adjusting the display according to the determined display angle,
   wherein the controller is further configured to: detect an additional adjustment to the display angle performed by the occupant; and save the additional adjustment associated with the occupant;
   wherein the controller is further configured to:
      identify the occupant before determining the display angle; and
      determine the display angle based on the detected seat-back angle and the saved additional adjustment associated with the identified occupant.

8. A method for automatically adjusting a display for an occupant of a vehicle, comprising:
   detecting a seat-back angle of a seat occupied by the occupant;
   determining a display angle based on the detected seat-back angle; and
   generating a control signal to actuate at least one motor for adjusting the display according to the determined display angle,
   wherein there are two or more occupants,
   wherein detecting the seat-back angle includes detecting seat-back angles of seats occupied by the two or more occupants, and
   wherein determining the display angle includes:
      determining individual display angles based on the detected seat-back angles; and
      determine the display angle based on the individual display angles.

9. The method of claim 8, wherein the controller is further configured to
- identify one of the occupants as the owner of the vehicle; and
- determine the display angle as the individual display angle determined based on the detected seat-back angle of the owner.

10. The method of claim 8, wherein the controller is further configured to:
- detect an additional adjustment to the display angle performed by the occupant; and
- save the additional adjustment associated with the occupant.

11. The method of claim 10, wherein the controller is further configured to:
- identify the occupant before determining the display angle; and
- determine the display angle based on the detected seat-back angle and the saved additional adjustment associated with the identified occupant.

* * * * *